(12) United States Patent
Jarman et al.

(10) Patent No.: US 10,843,105 B2
(45) Date of Patent: Nov. 24, 2020

(54) SEPARATOR FOR SEPARATING SOLIDS FROM A FLUID

(71) Applicant: Hydro International Ltd, Clevedon (GB)

(72) Inventors: Daniel Stuart Jarman, Somerset (GB); Steven John Daniels, Exeter (GB); Alma Rahat, Plymouth (GB); Jonathan Edward Fieldsend, Exeter (GB); Richard Everson, Exeter (GB); Gavin Tabor, Exeter (GB)

(73) Assignee: Hydro International Ltd, Clevedon (GB)

( * ) Notice: Subject to any disclaimer, the term of this patent is extended or adjusted under 35 U.S.C. 154(b) by 0 days.

(21) Appl. No.: 16/593,280

(22) Filed: Oct. 4, 2019

(65) Prior Publication Data
US 2020/0108333 A1    Apr. 9, 2020

(30) Foreign Application Priority Data

Oct. 5, 2018   (GB) .................................. 1816265.1

(51) Int. Cl.
| | | |
|---|---|---|
| *B01D 21/00* | (2006.01) | |
| *B01D 21/02* | (2006.01) | |
| *B01D 21/24* | (2006.01) | |
| *B01D 21/26* | (2006.01) | |

(52) U.S. Cl.
CPC ...... *B01D 21/0069* (2013.01); *B01D 21/2411* (2013.01); *B01D 21/265* (2013.01)

(58) Field of Classification Search
CPC ............ B01D 21/0069; B01D 21/2411; B01D 21/265
USPC ......................................................... 210/521
See application file for complete search history.

(56) References Cited

U.S. PATENT DOCUMENTS

| | | | | |
|---|---|---|---|---|
| 2,800,925 | A |   | 7/1957 | Tollefsen |
| 3,754,656 | A | * | 8/1973 | Horiguchi ............ B03D 1/1481 210/221.2 |
| 3,820,954 | A | * | 6/1974 | Stonner et al. .... B01D 11/0446 422/256 |
| 4,971,692 | A | * | 11/1990 | Sklokin .............. B01D 11/0453 210/519 |

(Continued)

FOREIGN PATENT DOCUMENTS

| | | |
|---|---|---|
| CN | 208486293 | 2/2019 |
| GB | 2525257 | 10/2015 |

OTHER PUBLICATIONS

United Kingdom Search and Examination Report for Application GB1902259.9 dated Jul. 22, 2019.

*Primary Examiner* — Claire A Norris
*Assistant Examiner* — Ekandra S. Miller-Cruz
(74) *Attorney, Agent, or Firm* — Honigman LLP

(57) ABSTRACT

A separator for separating solids from a fluid including a tray assembly, the tray assembly including a plurality of nested tray units which define a separator axis and are spaced apart from one another along the separator axis, wherein each tray unit includes comprising an inner surface facing the separator axis 16 extending outwards, away from an aperture in the tray unit disposed at the separator axis, wherein the inner surface comprises an inner portion and an outer portion, wherein the inner portion is disposed between the aperture and the outer portion, and wherein the gradient of the outer portion is greater than the gradient of the inner portion.

15 Claims, 12 Drawing Sheets

(56) References Cited

U.S. PATENT DOCUMENTS 7,824,549 B2 * 11/2010 Wilcher ............. B01D 21/0033
                                                    210/220
8,342,338 B2 *  1/2013 Andoh ............... B01D 21/0003
                                                    210/519

* cited by examiner

SEPARATOR FOR SEPARATING SOLIDS FROM A FLUID

TECHNICAL FIELD

This invention relates to a separator for separating solids from a fluid, and is particularly, although not exclusively, concerned with a separator for removing grit from wastewater flow.

BACKGROUND

Wastewater such as that arriving at a sewage treatment facility can contain grit which causes wear to processing equipment and, if the grit accumulates, loss of performance.

A separator for the removal of grit from wastewater flow is described in U.S. Pat. No. 6,645,382. The separator comprises a tray assembly made up of a plurality of stacked settling plates, in the form of trays having a frusto-conical shape. Each tray has a centrally located opening and a lip which extends about the periphery of the tray and projects inwardly. The trays are spaced apart axially so that wastewater may flow between the trays. The stacked trays are submerged in a vessel, such as a grit basin. An influent duct channels wastewater in between the trays and ensures that the wastewater is distributed evenly across the tray stack. The influent duct is arranged to provide a tangential inlet such that a low energy vortex flow is established between adjacent trays. The low energy vortex allows grit particles entrained by the flow to settle on the sloping inner surface of each tray whereupon the particles gravitate towards and pass through the openings in the trays. The grit falls through the openings in underlying trays and out through the bottom of the tray assembly. The grit collects at the bottom of the separator from where it is removed as a concentrate. De-gritted wastewater flows out over the lips of the trays into the grit basin for further processing.

In use, grit particles that have settled on the inner surface of each tray can become resuspended. This reduces the separation efficiency of the separator.

SUMMARY

According to an aspect of the invention there is provided a separator for separating solids from a fluid comprising a tray assembly. The tray assembly comprises a plurality of nested tray units which define a separator axis and are spaced apart from one another along the separator axis. Each tray unit comprises an inner surface facing the separator axis and extending outwards, away from an aperture in the tray unit disposed at the separator axis. The inner surface comprises an inner portion and an outer portion. The inner portion is disposed between the aperture and the outer portion. The gradient of the outer portion is greater than the gradient of the inner portion.

The inner surface of each tray unit may comprise a middle portion disposed between the inner portion and the outer portion. The gradient of the middle portion may be greater than the gradient of the inner portion and less than the gradient of the outer portion.

One or more of the inner portion, the outer portion and the middle portion of the inner surface of each tray unit may be aligned with the separator axis.

An outer periphery of each tray unit may define the outer portion of the inner surface of the tray unit.

The inner portion of each tray unit may define the aperture.

The inner surface of each tray unit may be smoothly graduated between two or more of the inner portion, the outer portion and the middle portion such that two or more of the inner portion, the outer portion and the middle portion form part of a single, continuous surface.

One or more of the inner portion, the outer portion and the middle portion of each tray unit may be frusto-conical.

The outer portion of each tray unit may extend vertically.

The inner surface of each tray unit may comprise a step between two or more of the inner portion, the outer portion and the middle portion.

The step may be oriented substantially perpendicular to the separator axis.

The gradient of one or more of the inner portion, the outer portion and the middle portion of each tray unit may gradually decrease towards the aperture.

The inner surface of each tray unit may be concave.

The inner portion of each tray unit may be oriented substantially perpendicular to the separator axis.

An annular passageway may be formed between each pair of adjacent tray units in the tray assembly.

The mid-plane radius of each tray unit may be approximately 43 centimeters. The axial length of each tray unit may be approximately 41 centimeters. The radius of the entirety of the concave section of the inner surface may be approximately 54 centimeters.

There may be provided a tray assembly as described in any preceding statement. There may be provided a tray unit as described in any preceding statement.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
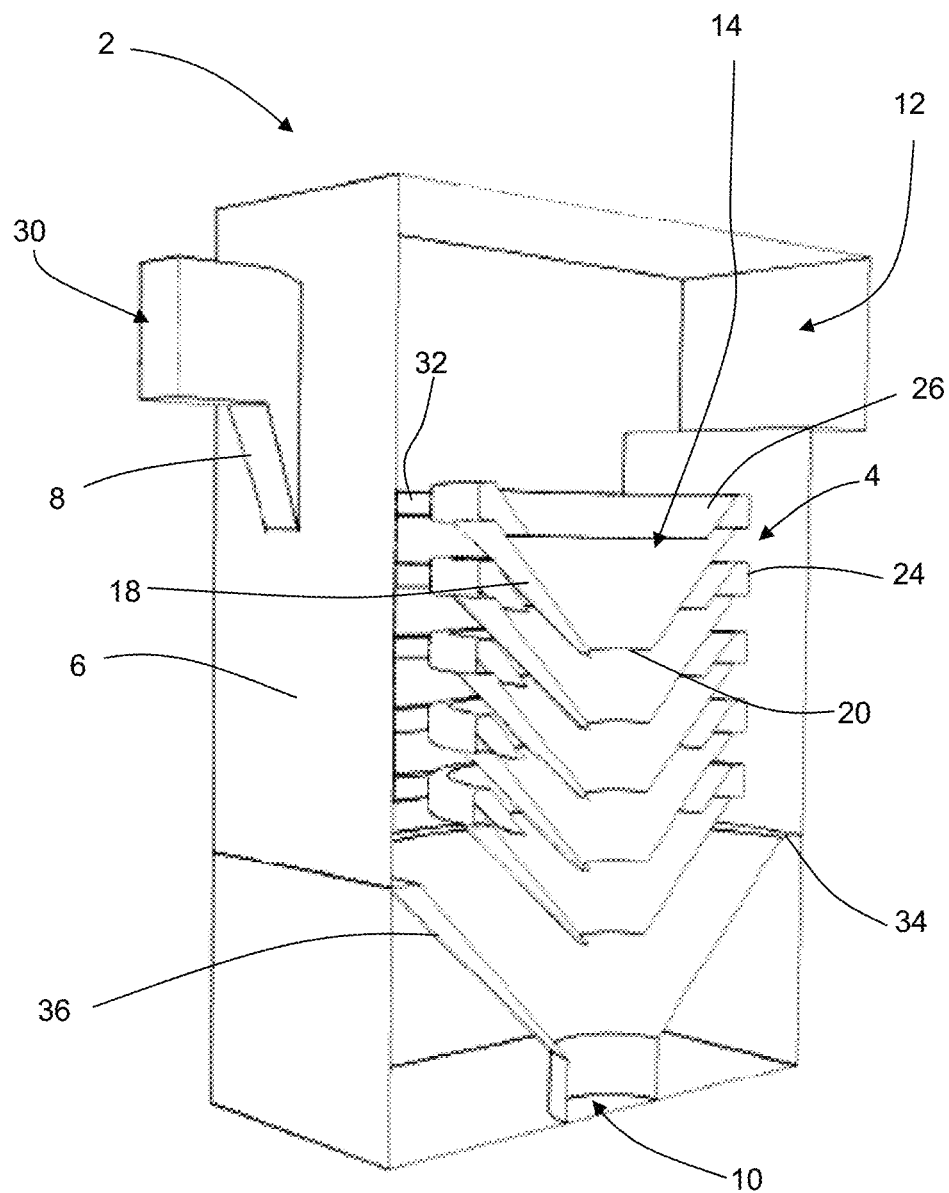
FIG. 1 is a perspective sectional view of a known separator comprising a known separator tray assembly.

FIG. 1 shows a known separator 2 comprising a tray assembly 4 disposed within a treatment vessel 6. The tray assembly 4 comprises a plurality of nested tray units 14. Five tray units 14 are shown in FIG. 1, but it will be appreciated that the tray assembly could comprise more or fewer tray units 14. The nested tray units 14 define a separator axis 16, shown in FIGS. 2 and 3, which is upright and preferably substantially vertical. The tray units 14 are spaced apart from each other along the axis 16. The treatment vessel 6 is provided with an inlet chute 8, a grit outlet 10 and a fluids outlet 12.

Each tray unit 14 comprises a frusto-conical portion 18, an axis of which is aligned with the separator axis 16. The frusto-conical portion 18 converges in a downward direction. Each tray unit 14 has a circular aperture 20 at an apex of the tray unit 14. The aperture 20 is aligned with the separator axis 16. The outer periphery of the tray unit 14 is formed by a cylindrical rim 24 that extends upwardly from the outer periphery of the frusto-conical portion 18. An annular lip 26 extends radially inwardly from the extremity of the rim 24. The radially inward portion of the annular lip 26 is inclined so as to be parallel to the direction of the inner surface of the tray 18. The rim 24 and annular lip 26 may be formed integrally with the tray 18 by a folded over portion of the tray 18. The rim 24 and annular lip 26 can be separately manufactured and assembled with the frusto-conical portion 18, or can be formed integrally with the frusto-conical portion 18, for example, when the tray is a plastics molding.

Figure 2:
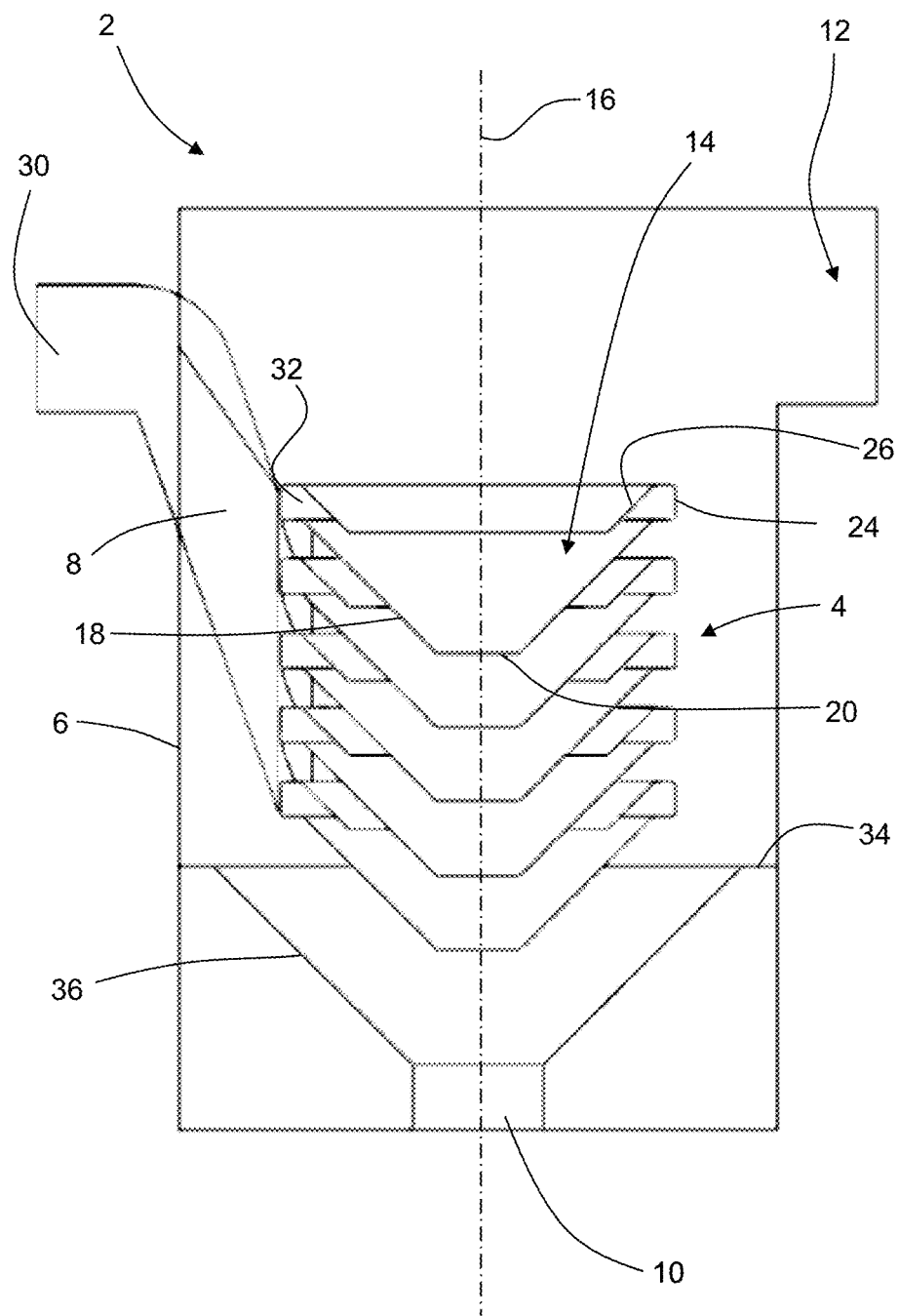
FIG. 2 is a sectional view of the separator shown in FIG. 1.
Figure 3:
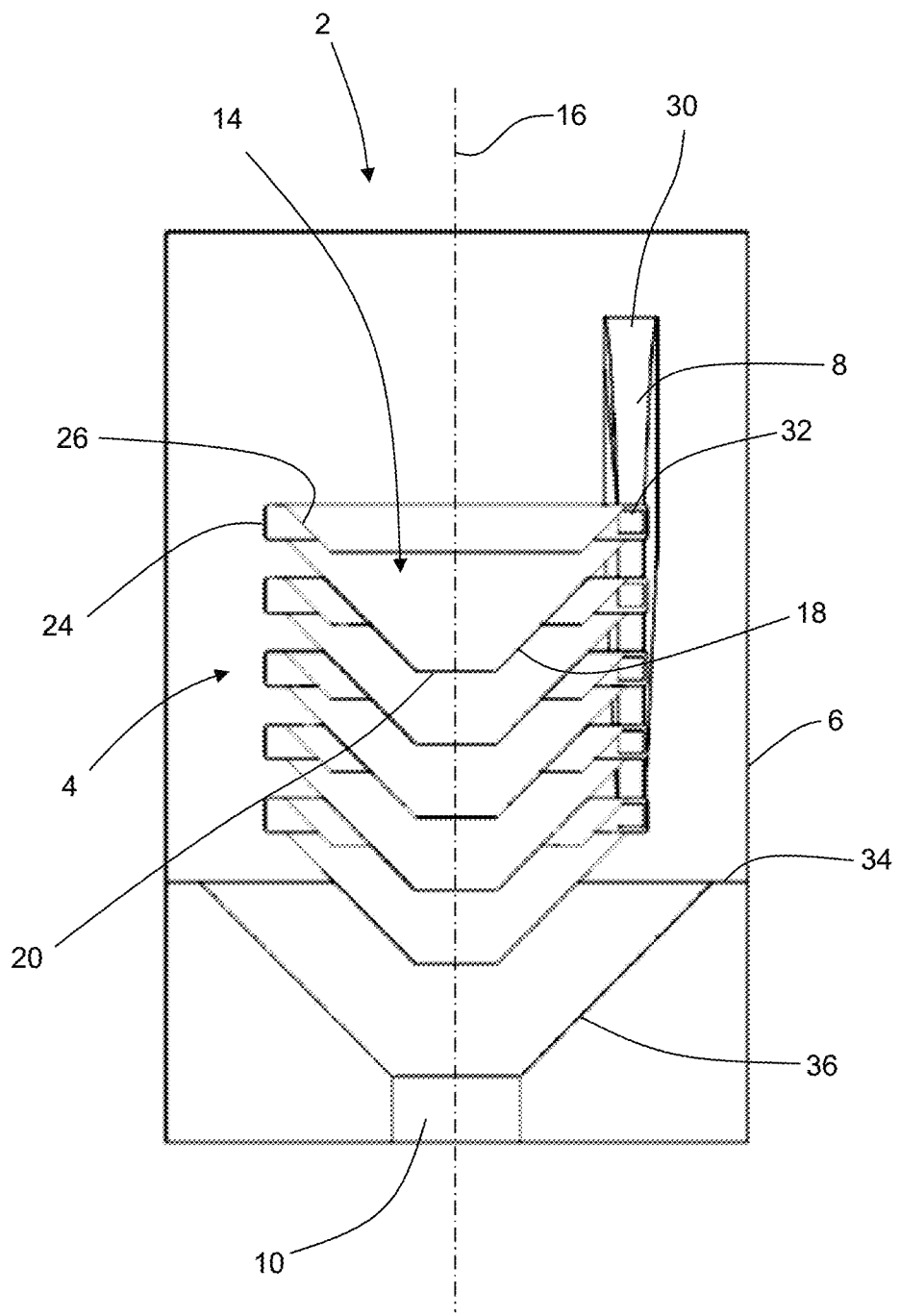
FIG. 3 is a sectional view of the separator shown in FIG. 1 taken in a direction perpendicular to that of FIG. 2.
Figure 4:
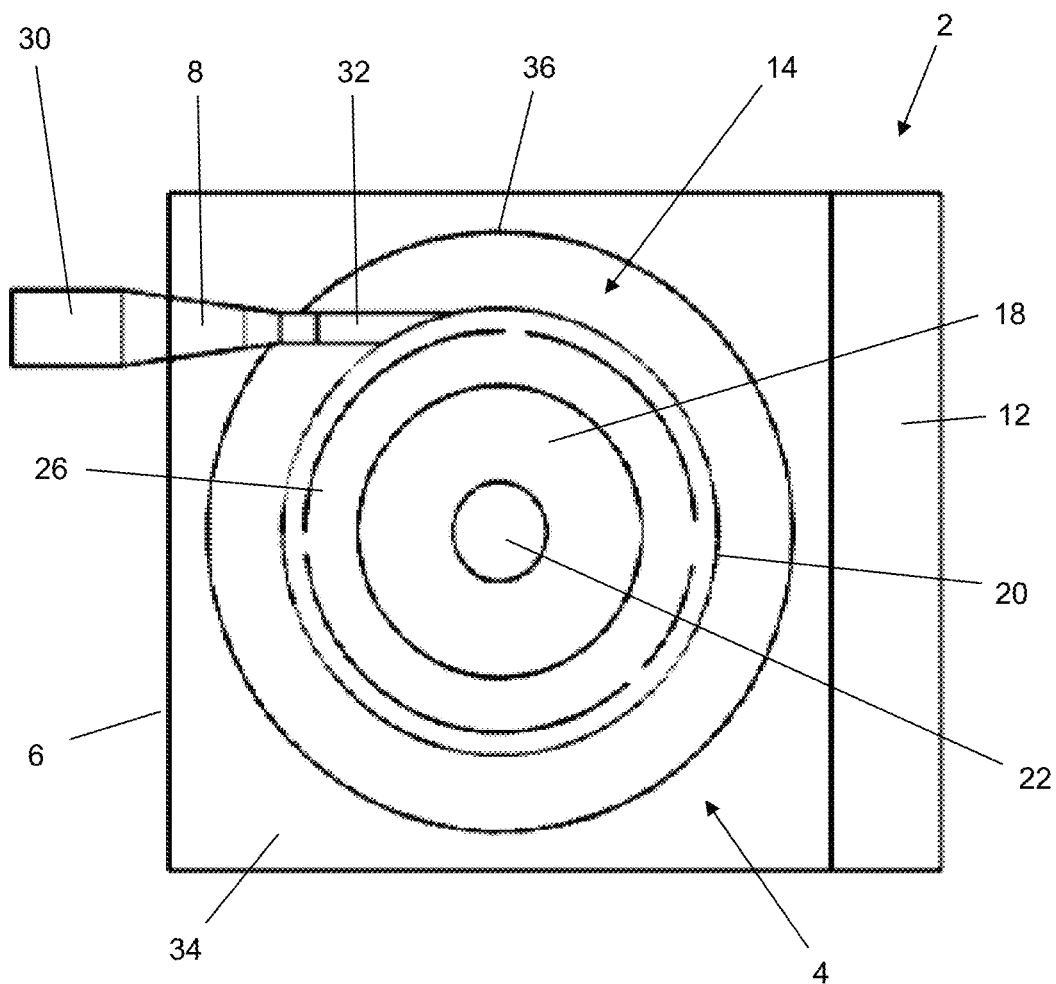
FIG. 4 is a sectional plan view of the separator shown in FIG. 1.

Referring to FIGS. 2 and 3, the inlet chute 8 has a single inlet 30 and a plurality of outlets 32. The chute 8 extends into the treatment vessel 6 through an outer wall of the treatment vessel 6 and is in direct communication with the tray assembly 4. The mid-portion of the chute 8 is inclined in a downward direction from the inlet 30 to the outlets 32. The mid-portion of the chute 8 diverges in a vertical direction from the inlet 30 towards the outlets 32. The outlets 32 are aligned vertically and extend from the lower end of the mid-portion of the chute in a horizontal direction. Each of the outlets 32 is in direct communication with a respective tray unit 14 and arranged tangentially with respect to the separator axis 16 (shown in FIGS. 3 and 4). In particular, the outlets 32 are in direct communication with the region between the annular lip 26 and the inner surface of the frusto-conical portion 18.

A plate 34, provided with a funnel section 36, is disposed within the base of the treatment vessel 6. The plate 34 extends horizontally across the extent of the vessel 6 and the funnel section 36 converges in a downward direction. The outlet 10 is provided in the lower region of the funnel section 36 and opens into a sump (not shown) below the vessel 6. The funnel section 36 is arranged coaxially with the separator axis 16. The funnel section 36 may extend across the full extent of the vessel 6, particularly where the vessel is cylindrical. The funnel section 36 would thus continue upwardly to the side walls of the vessel 6.

The separator 2 may be part of a waste water treatment installation, and its function may be to separate grit and similar particles from a flow of waste water prior to further treatment processes.

During use, the treatment vessel 6 is flooded so that the tray assembly 4 is submerged. An influent mixture such as grit entrained by water is supplied though the chute inlet 30 and flows downwardly along the chute 8 and through the outlets 32 into respective tray units 14. The tangential arrangement of the outlets 32 causes the mixture to circulate within the tray units 14 about the separator axis 16.

The circulating flow is a relatively low energy flow which allows the entrained grit to settle on the inner surfaces of the trays 18. The sloped inner surface of each frusto-conical portion 18 causes the grit to gravitate towards the aperture 20 in the frusto-conical portion 18. The grit falls through the aperture 20, settles on the inner surface of the underlying frusto-conical portion 18 and gravitates towards and through the aperture 20 of the underlying frusto-conical portion 18. The grit passes through the respective apertures 20 of the underlying frusto-conical portion 18 until it is expelled from the bottom of the tray assembly 4. The grit is then discharged from the treatment vessel 6 through the outlet 10, for example, to the sump (not shown) beneath the vessel 6.

As the de-gritted water circulates within each tray unit 14, it flows upwardly over the annular lip 26 and over the rim 24 into the outer region of the treatment vessel 6. The annular lips 26 thus help to retain grit which has collected on the surface of each frusto-conical portion 18 within the tray units 14. De-gritted water which collects in the vessel 6 overflows through the outlet 12.

FIGS. 5 to 9 show cross-sectional profiles of first, second, third and fourth tray units 40, 60, 80, 100 according to embodiments of the invention. Although only a single cross-sectional profile is shown for each tray unit 40, 60, 80, 100, it will be appreciated that the surfaces shown in the cross-sectional profiles extend around the entirety of the separator axis 16. A separator 2 according to an embodiment of the invention may comprise a tray assembly 4 comprising a plurality of nested first tray units 40, a plurality of nested second tray units 60, a plurality of nested third tray units 80 or a plurality of nested fourth tray units 100, for example, instead of a plurality of nested tray units 14 as described with reference to FIGS. 1 to 4. All other structural aspects of a separator 2 according to the invention may be the same as the known separator 2 described with reference to FIGS. 1 to 4. For example, although not shown in FIGS. 5 to 9, each of the outlets 32 of an inlet chute 8 of a separator 2 according to the invention may be in direct communication with respective first, second, third or fourth tray units 40, 60, 80, 100.

Figure 5:
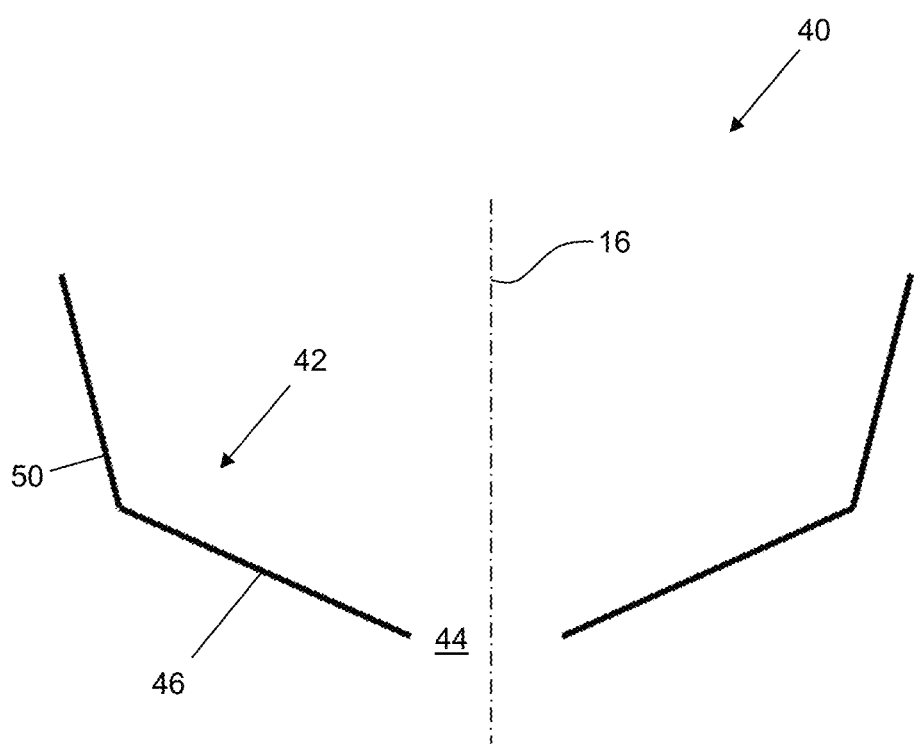
FIG. 5 shows a cross-sectional profile of a first tray unit according to a first embodiment of the invention.

As shown in FIG. 5, the first tray unit 40 comprises an inner surface 42 that faces towards the separator axis 16. The inner surface 42 is an upper surface of the first tray unit 40. The inner surface 42 extends outwards, away from an aperture 44 located at an apex of the first tray unit 40. The aperture 44 is aligned with the separator axis 16. Accordingly, the inner surface 42 extends away from the separator axis 16. The inner surface 42 comprises an inner portion 46 and an outer portion 50. The inner portion 46 is disposed between the aperture 44 and the outer portion 50. The inner portion 46 defines the aperture 44. The outer periphery of the first tray unit 40 defines the outer portion 50.

The inner portion 46 and the outer portion 50 are frusto-conical. The axes of the frusto-conical inner and outer portions 46, 50 (i.e. their axes of symmetry) are aligned with the separator axis 16. The inner and outer portions 46, 50 are angled with respect to the separator axis 16 (i.e. they are non-vertical). The inner and outer portions 46, 50 converge in a downward direction towards the aperture 44. The gradient of the outer portion 50 is greater than the gradient of the inner portion 46. That is, the angle formed between the outer portion 50 and the separator axis 16 is less than the angle formed between the inner portion 46 and the separator axis 16. Accordingly, the inner surface 42 has an approximately concave shape.

Figure 6:
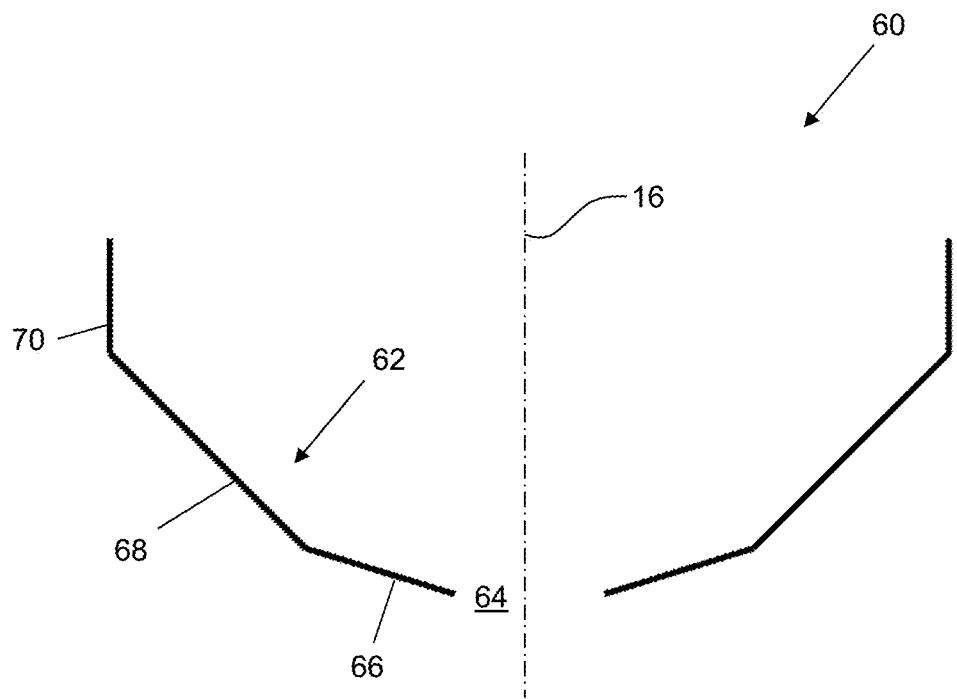
FIG. 6 shows a cross-sectional profile of a second tray unit according to a second embodiment of the invention.

As shown in FIG. 6, the second tray unit 60 comprises an inner surface 62 that faces towards the separator axis 16. The inner surface 62 is an upper surface of the second tray unit 60. The inner surface 62 extends outwards, away from an aperture 64 located at an apex of the second tray unit 60. The aperture 64 is aligned with the separator axis 16. Accordingly, the inner surface 62 extends away from the separator axis 16. The inner surface 62 comprises an inner portion 66, a middle portion 68 and an outer portion 70. The inner portion 66 is disposed between the aperture 64 and the middle portion 68. The middle portion 68 is disposed between the inner portion 66 and the outer portion 70. Accordingly, the inner portion 66 is disposed between the aperture 64 and the outer portion 70. The inner portion 66 defines the aperture 64. The outer periphery of the second tray unit 60 defines the outer portion 70.

The inner portion 66 and the middle portion 68 are frusto-conical. The outer portion 70 extends vertically and is cylindrical. The axes of the frusto-conical inner and middle portions 66, 68 (i.e. their axes of symmetry) and the axis of the cylindrical outer portion 70 are aligned with the separator axis 16. The inner and middle portions 66, 68 converge in a downward direction towards the aperture 64. The gradient of the middle portion 68 is greater than the gradient of the inner portion 66 and less than the gradient of the outer portion 70. That is, the angle formed between the middle portion 68 and the separator axis 16 is less than the angle formed between the inner portion 66 and the separator axis 16 and greater than the angle formed between the outer portion 70 and the separator axis 16. The angle formed between the outer portion 70 and the separator axis 16 is therefore less than the angle formed between the inner portion 66 and the separator axis 16. Accordingly, the inner surface 62 has an approximately concave shape.

Figure 7:
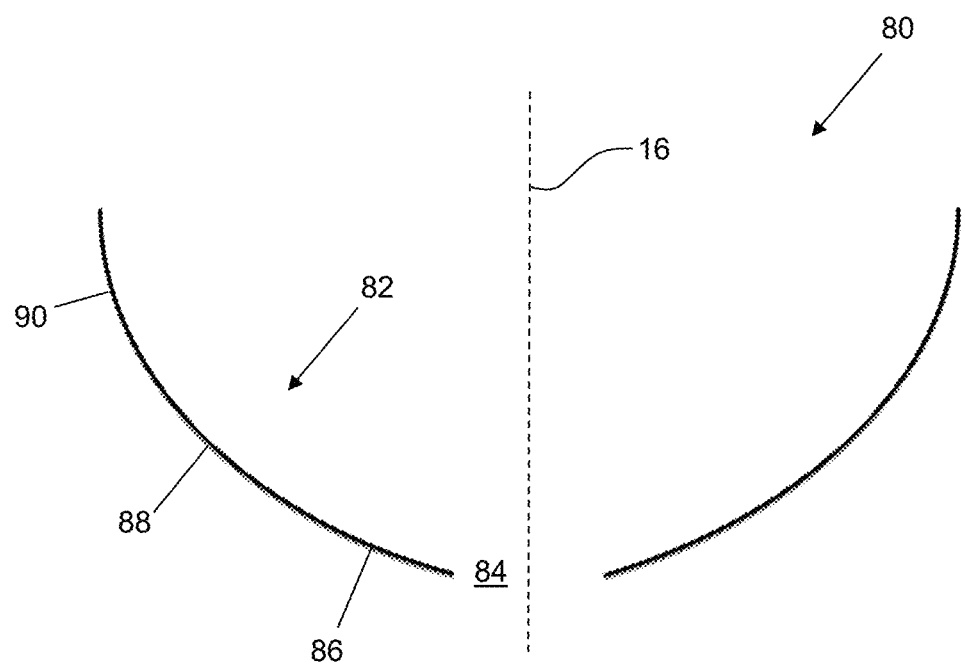
FIG. 7 shows a cross-sectional profile of a third tray unit according to a third embodiment of the invention.

As shown in FIG. 7, the third tray unit 80 comprises an inner surface 82 that faces towards the separator axis 16. The inner surface 82 is an upper surface of the third tray unit 80. The inner surface 82 extends outwards, away from an aperture 84 located at an apex of the third tray unit 80. The aperture 84 is aligned with the separator axis 16. Accordingly, the inner surface 82 extends away from the separator axis 16. The inner surface 82 comprises an inner portion 86, a middle portion 88 and an outer portion 90. The inner portion 86 is disposed between the aperture 84 and the middle portion 88. The middle portion 88 is disposed between the inner portion 86 and the outer portion 90. Accordingly, the inner portion 86 is disposed between the aperture 84 and the outer portion 90. The inner portion 86 defines the aperture 84. The outer periphery of the third tray unit 80 defines the outer portion 90.

The axes of the inner, middle and outer portions 86, 88, 90 (i.e. their axes of symmetry) are aligned with the separator axis 16. The inner, middle and outer portions 86, 88, 90 converge in a downward direction towards the aperture 84. The gradient of the middle portion 88 is greater than the gradient of the inner portion 86 and less than the gradient of the outer portion 90. That is, the angle formed between the middle portion 88 and the separator axis 16 is less than the angle formed between the inner portion 86 and the separator axis 16 and greater than the angle formed between the outer portion 90 and the separator axis 16. The angle formed between the outer portion 90 and the separator axis 16 is therefore less than the angle formed between the inner portion 86 and the separator axis 16.

The gradients of each of the inner, middle and outer portions 86, 88, 90 gradually decrease towards the aperture 84. Accordingly, each of the inner portion 86, the middle portion 88 and the outer portion 90 curve towards the separator axis 16 in a downwards direction (i.e. towards the aperture 84). The inner surface 82 is smoothly graduated (i.e. curved) between the inner, middle and outer portions 86, 88, 90 such that the inner, middle and outer portions 86, 88, 90 form part of a single, continuous surface. The gradient of the inner surface 82 as a whole gradually decreases towards the aperture 84. Accordingly, the inner surface 82 is concave (i.e. bowl-shaped).

Figure 8:
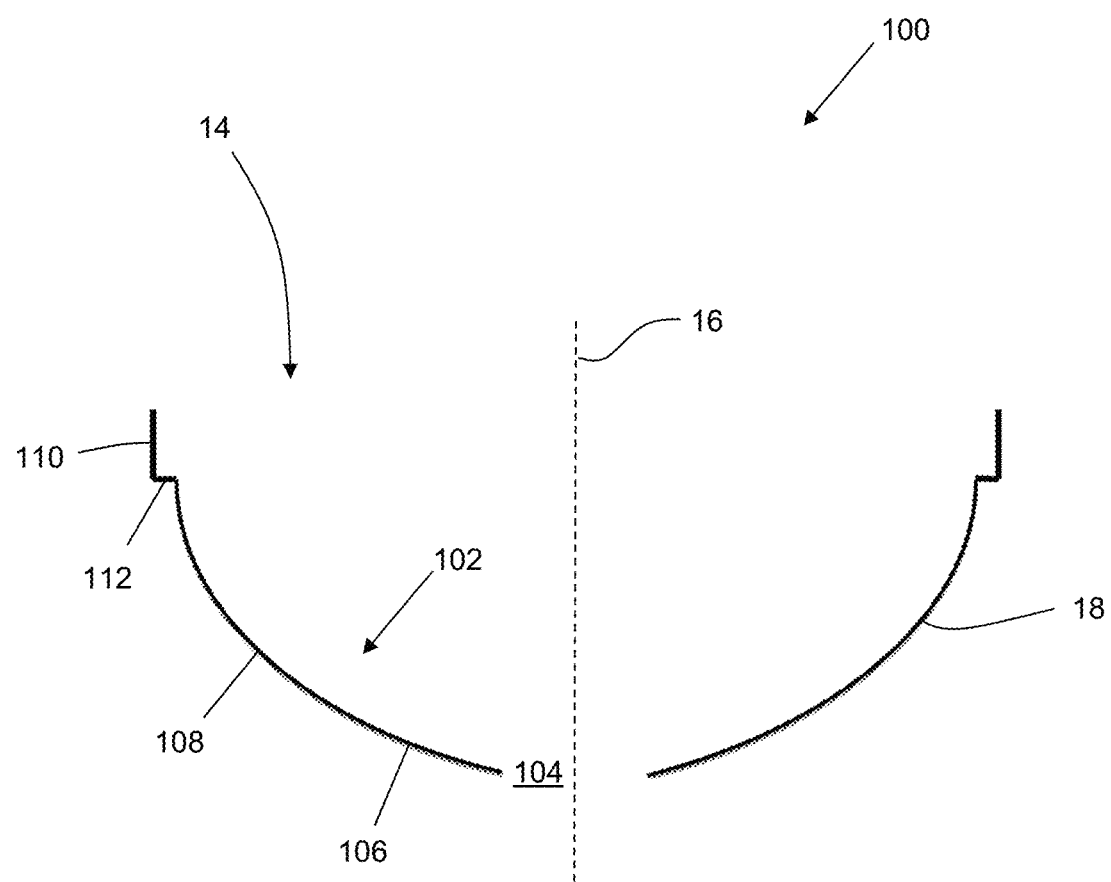
FIG. 8 shows a cross-sectional profile of a fourth tray unit according to a fourth embodiment of the invention.

As shown in FIG. 8, the fourth tray unit 100 comprises an inner surface 102 that faces towards the separator axis 16. The inner surface 102 is an upper surface of the fourth tray unit 100. The inner surface 102 extends outwards, away from an aperture 104 located at an apex of the fourth tray unit 100. The aperture 104 is aligned with the separator axis 16. Accordingly, the inner surface 102 extends away from the separator axis 16. The inner surface 102 comprises an inner portion 106, a middle portion 108 and an outer portion 110. The inner portion 106 is disposed between the aperture 104 and the middle portion 108. The middle portion 108 is disposed between the inner portion 106 and the outer portion 110. Accordingly, the inner portion 106 is disposed between the aperture 104 and the outer portion 110. The inner portion 106 defines the aperture 104. The outer periphery of the fourth tray unit 100 defines the outer portion 110. The inner surface 102 further comprises a step 112 disposed between the middle portion 108 and the outer portion 110. The step 112 is planar and extends radially outwards, such that it is oriented substantially perpendicular to the separator axis 16.

The axes of the inner, middle and outer portions 106, 108, 110 (i.e. their axes of symmetry) are aligned with the separator axis 16. The inner and middle portions 106, 108 converge in a downward direction towards the aperture 104. The gradient of the middle portion 108 is greater than the gradient of the inner portion 106 and less than the gradient of the outer portion 110. That is, the angle formed between the middle portion 108 and the separator axis 16 is less than the angle formed between the inner portion 106 and the separator axis 16 and greater than the angle formed between the outer portion 110 and the separator axis 16. The angle formed between the outer portion 110 and the separator axis 16 is therefore less than the angle formed between the inner portion 106 and the separator axis 16.

The outer portion 110 extends vertically and is cylindrical. The gradients of each of the inner and middle portions 106, 108 gradually decreases towards the aperture 104. Accordingly, each of the inner portion 106 and the middle portion 108 curve towards the separator axis 16 in a downwards direction (i.e. towards the aperture 104). The innermost portion of the inner portion 106 is approximately horizontal (i.e. perpendicular to the separator axis 16). The inner surface 102 is smoothly graduated (i.e. curved) between the inner and middle portions 106, 108 such that the inner and middle portions 106, 108 form part of a single, continuous surface. The gradient of the inner surface 102 forming the inner portion 106 and middle portion 108 gradually decreases towards the aperture 104. Accordingly, the section of the inner surface 102 forming the inner portion 106 and middle portion 108 is concave (i.e. bowl-shaped).

Figure 9:
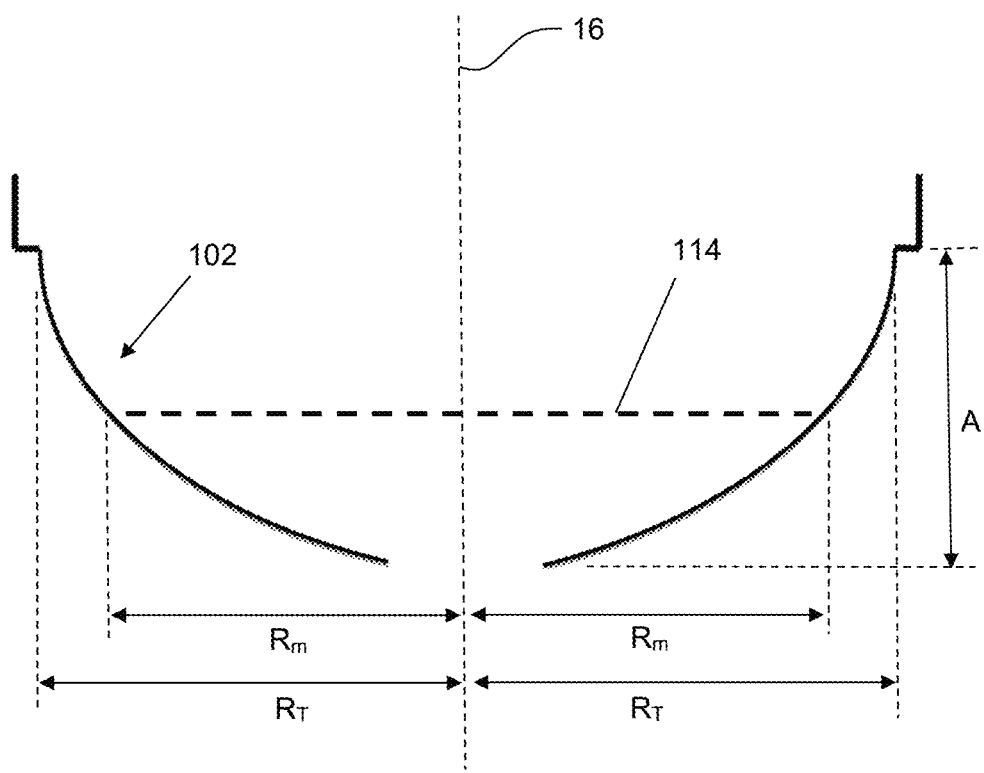
FIG. 9 is an annotated view of the cross-sectional profile of the fourth tray unit shown in FIG. 8.

The concave profile of the inner surface 102 of the fourth tray unit 100 will now be described with reference to FIG. 9. As shown, the concave section of the inner surface 102 (i.e. the section of the inner surface 102 formed be the inner and middle portions 106, 108) has an axial length A. A mid-plane 114 of the concave section is located half-way along the axial length A, oriented orthogonally to the separator axis 16. The radius of the concave section of the inner surface 102 at the mid-plane 114 is referred to as its mid-plane radius Rm. In the example arrangement shown in FIG. 9, the mid-plane radius Rm is approximately 43 centimeters, the axial length is approximately 41 centimeters and the radius RT of the entirety of the concave section of the inner surface 102 is approximately 54 centimeters. These dimensions can be used to describe the concave profile of the inner surface of any tray unit according to an embodiment of the invention.

Figure 10:
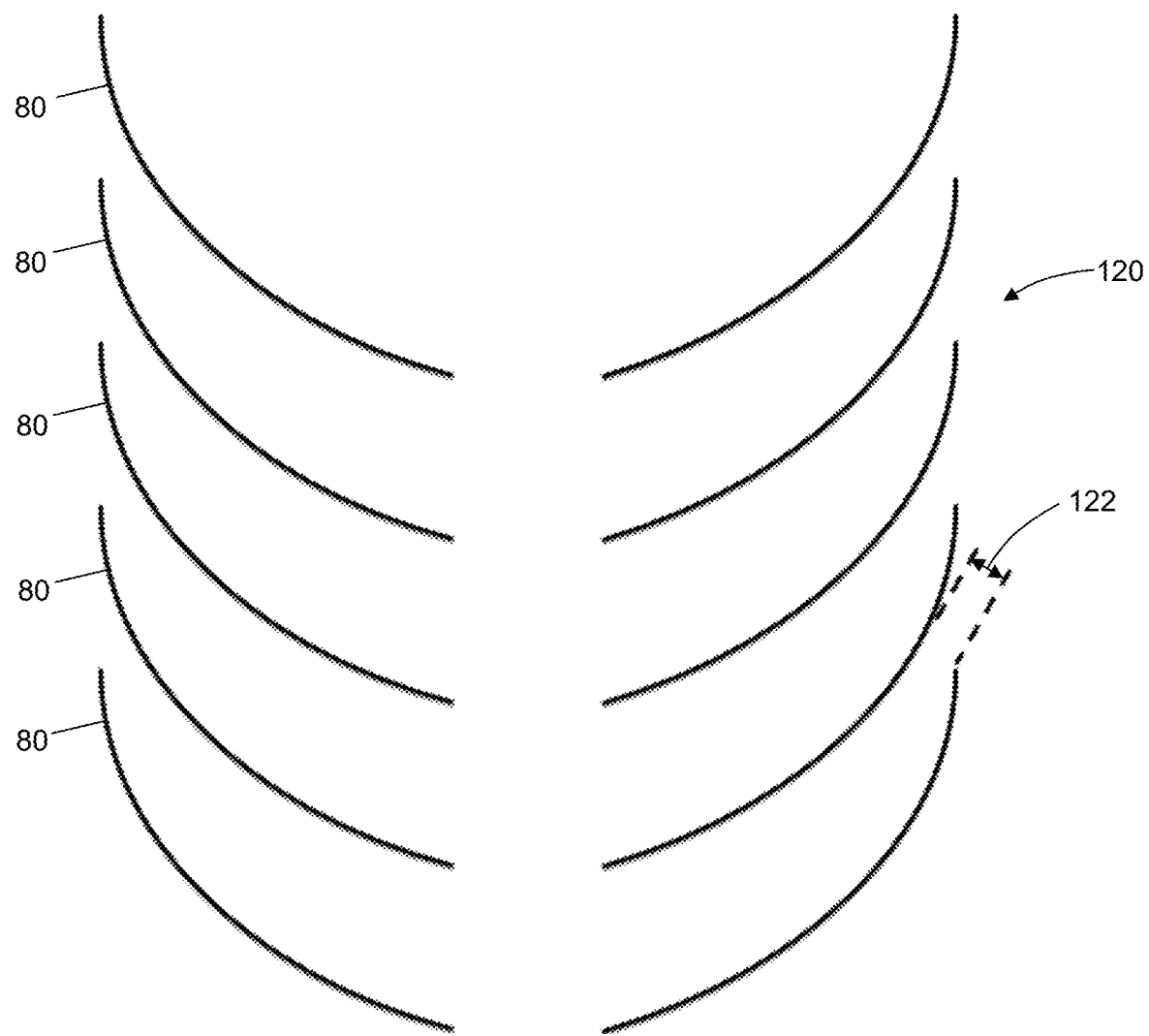
FIG. 10 is a sectional side view of a tray assembly according to an embodiment of the invention comprising a plurality of the third tray units.

FIG. 10 shows a tray assembly 120 for use in a separator 2 according to an embodiment of the invention. The tray assembly 120 comprises a plurality of nested third tray units 80. In alternative arrangements the tray assembly 120 may however comprise a plurality of first, second or fourth tray units 40, 60, 100 as described above. An annular passageway 122 is formed between each pair of adjacent tray units 80 in the tray assembly 120. In particular, an annular passageway 122 is defined between the upper peripheral edges of the outer portions 90 of the tray units 80 and an adjacent tray unit 80 located above the outer portion 90. The width of the annular passageway 122 is measured as the smallest distance between adjacent tray units 80. The width of the annular passageway 122 may be approximately 2 centimeters.

In use, as the de-gritted water circulates within each tray unit 80, it flows through the annular passageway 122 and into the outer region of the treatment vessel 6. The concave profile of the tray unit 80 reduces the gap between the tray units 80 at the annular passageway 122. This provides a flow restriction which inhibits (i.e. throttles) flow through the annular passageway 122 and out of the tray units 80, which improves the flow distribution around the perimeter of the tray units 80 and which improves the sediment removal efficiency. In addition, the concave profiles of the tray units 80 increase the surface area of the tray units 80 for a given tray unit 80 diameter, aperture 84 diameter and axial length A. Accordingly, the area over which the low energy flow of the circulating flow passes is increased, and, thus, the area on which entrained grit is able to settle is increased. This increases the rate at which entrained grit settles on the tray unit 80 and thus enhances sediment capture.

In use, a recirculating, precessing vortex core is formed along the separator axis 16, which can resuspend grit that has settled on the inner surfaces 82 of the tray units 80. However, the concave profiles of the tray units 80 reduce the proportion of the surface area of the tray units 80 close to the aperture 84 and dissipates the vortex core, thereby reducing the amount of grit that is resuspended and increasing the amount of grit falling through the apertures 84 and out of the outlet 10.

Due to the improved performance of the system, the each tray unit 80, as well as the separator 2 as a whole, can be reduced in size. Alternatively, each tray unit 80 can be made to be substantially the same size as existing tray units 14 such that they can be retrofitted into existing separators 2.

The first, second and fourth tray units 40, 60, 100 may function in substantially the same manner as the third tray units 80, and the same benefits as those described above in relation to the third tray units 80 may be provided by the first, second or fourth tray units 40, 60, 100, with their concave or approximately concave profiles.

Figure 11:
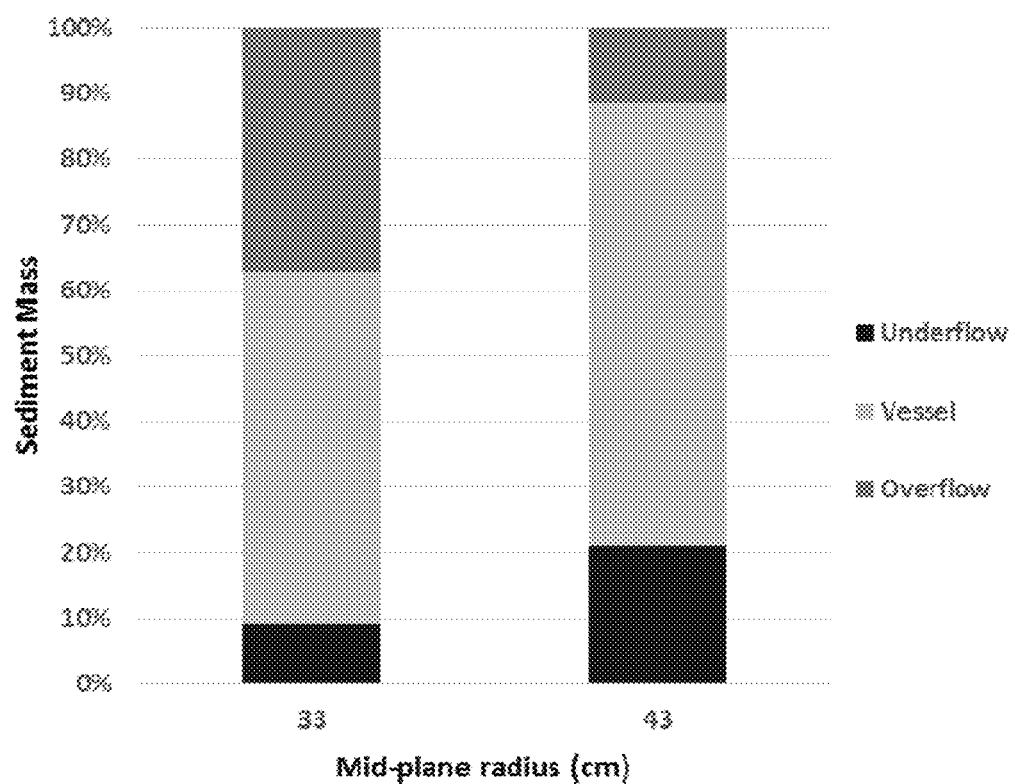
FIG. 11 is a stacked column chart showing the collection efficiency of a known separator and the collection efficiency of a separator comprising a plurality of tray units according to an embodiment of the invention.

FIG. 11 is a stacked column chart comparing the efficiency of a known separator 2 comprising a plurality of tray units 14 having a mid-plane radius Rm of 33 centimeters and a separator 2 according to an embodiment of the invention comprising a plurality of fourth tray units 100 having a mid-plane radius Rm of 43 centimeters. In the data shown in FIG. 11, the flow rate of the influent mixture into the separators 2 is 3690 liters per minute. As shown, the proportion of the mass of grit (i.e. sediment) entering the known separator 2 that passes out as underflow (i.e. out of the separator via the series of apertures) is approximately 9%. In the separator 2 according to the embodiment of the invention, this proportion increases to approximately 21%. Further, the proportion of the mass of grit entering the known separator 2 that passes out as overflow (i.e. out of the separator 2 via the annular passageway) is approximately 37%. In the separator 2 according to the embodiment of the invention, this proportion decreases to approximately 12%. In addition, the proportion of the mass of grit entering the known separator 2 that is retained within the treatment vessel 6 is approximately 54%. In the separator 2 according to the embodiment of the invention, this proportion increases to approximately 67%.

Figure 12:
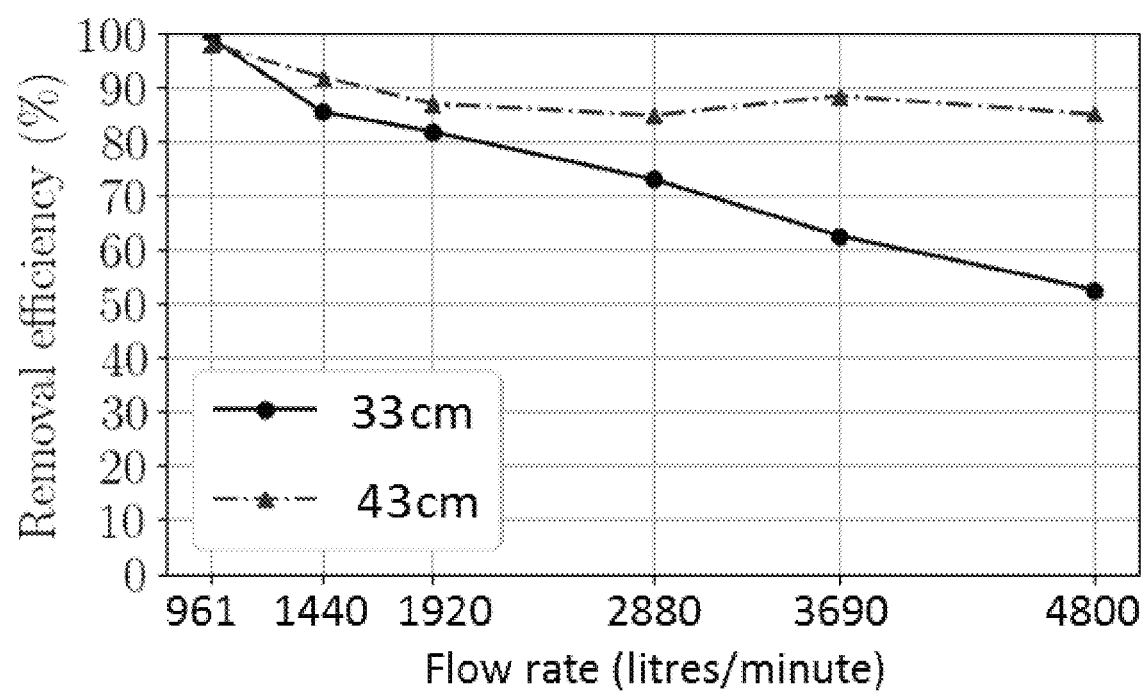
FIG. 12 is a line chart showing the removal efficiency of the known separator and the removal efficiency of the separator comprising a plurality of tray units according to an embodiment of the invention at a plurality of flow rates.

FIG. 12 is a line chart comparing how the removal efficiency of the known separator 2 and the separator 2 according to an embodiment of the invention varies according to the flow rate of the influent mixture into the separators 2. In FIG. 12, the removal efficiency is the proportion of the mass of grit entering the known separator 2 that passes out as underflow and is retained within the treatment vessel 6. As shown, the removal efficiency of the known separator 2 decreases from almost 100% at a flow rate of 961 liters per minute (254 gallons per minute) to approximately 50% at a flow rate of 4800 liters per minute (1268 gallons per minute). In contrast, the removal efficiency of the separator 2 according to an embodiment of the invention decreases from almost 100% at a flow rate of 961 liters per minute to approximately 85% at a flow rate of 4800 liters per minute.

Although it has been described that the inner surfaces 42, 62, 102 of the first, second and fourth tray units 40, 60, 100 comprise two to four portions having different gradients approximating a concave shape, tray units according to an embodiment of the invention may comprise inner surfaces having five or more portions (e.g. frusto-conical or cylindrical portion) having different gradients approximating a concave shape.

The invention claimed is:

1. A separator for separating solids from a fluid, comprising:
   a tray assembly including a plurality of nested tray units which define a separator axis and are spaced apart from one another along the separator axis, wherein each tray unit includes an inner surface facing the separator axis and extending outwards, away from an aperture in the tray unit disposed at the separator axis, wherein the inner surface includes an inner portion and an outer portion, wherein the inner portion is disposed between the aperture and the outer portion, and wherein the gradient of the outer portion is greater than the gradient of the inner portion,
   wherein the inner surface of each tray unit includes a middle portion disposed between the inner portion and the outer portion, wherein the gradient of the middle portion is greater than the gradient of the inner portion and less than the gradient of the outer portion, wherein the inner portion is concave in a cross section taken along the separator axis.

2. A separator as claimed claim 1, wherein at least one or more of the inner portion, the outer portion and the middle portion of the inner surface of each tray unit are aligned with the separator axis.

3. A separator as claimed in claim 1, each tray in the plurality of nested tray units includes an outer periphery that defines the outer portion of the inner surface of each respective tray unit.

4. A separator as claimed in claim 1, wherein the inner portion of each tray unit defines the aperture.

5. A separator as claimed in claim 1, wherein the inner surface of each tray unit is smoothly graduated between two or more of the inner portion, the outer portion and the middle portion such that two or more of the inner portion, the outer portion and the middle portion form part of a single, continuous surface.

6. A separator as claimed in claim 1, wherein one or more of the inner portion, the outer portion and the middle portion of each tray unit are frusto-conical.

7. A separator as claimed in claim 1, wherein the outer portion of each tray unit extends vertically.

8. A separator as claimed in claim 1, wherein the inner surface of each tray unit includes a step between at least one of (i) the inner portion and the middle portion, or (ii) the outer portion and the middle portion.

9. A separator as claimed in claim 8, wherein the step is oriented substantially perpendicular to the separator axis.

10. A separator as claimed in claim 4, wherein the gradient of one or more of the inner portion, the outer portion and the middle portion of each tray unit gradually decreases towards the aperture.

11. A separator as claimed in claim 1, wherein the inner surface of each tray unit is concave.

12. A separator as claimed in claim 1, wherein the inner portion of each tray unit is oriented substantially perpendicular to the separator axis.

13. A separator as claimed in claim 1, wherein an annular passageway is formed between each pair of adjacent tray units in the tray assembly.

14. A tray assembly or tray unit as claimed in claim 1.

15. The separator as claimed in claim 1, wherein the gradient of an entirety of the middle portion is greater than the gradient of an entirety of the inner portion and less than the gradient of an entirety of the outer portion.

* * * * *